Dec. 28, 1948.  J. J. SUESS  2,457,745
CONVERTIBLE VEHICLE DRAW-BAR
Filed Sept. 10, 1945
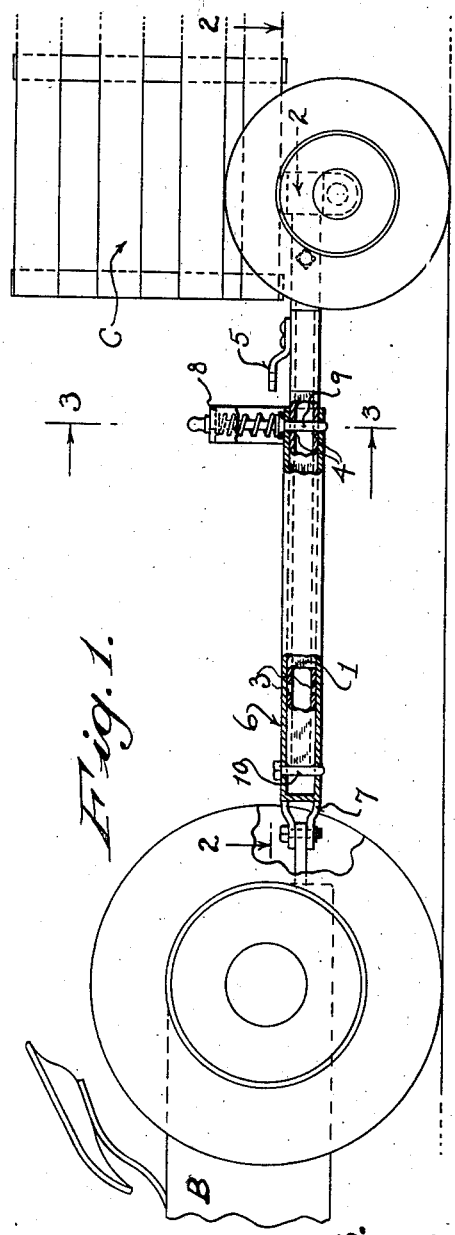
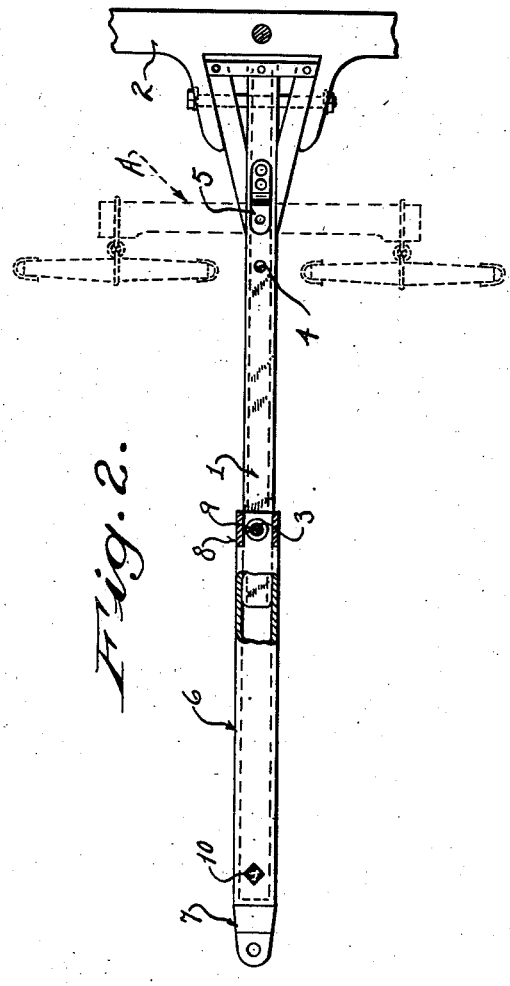
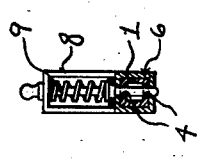
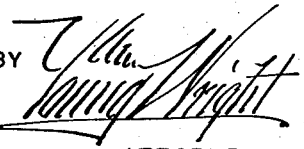
INVENTOR
JULIUS J. SUESS
BY
ATTORNEYS Patented Dec. 28, 1948

2,457,745

UNITED STATES PATENT OFFICE 2,457,745

CONVERTIBLE VEHICLE DRAWBAR

Julius J. Suess, West Allis, Wis.

Application September 10, 1945, Serial No. 615,464

1 Claim. (Cl. 280—33.44)

My invention refers to draw-bars, particularly adapted for use in connection with various wheeled agricultural implements, such, for example, as seeders, rakes, mowers, wagons, or the like. The said draw-bar being particularly applicable to the tongues of animal draft implements or vehicles, whereby the same may be coupled to a power draft unit and to a horse drawn tongue unit.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 represents a side elevation of a convertible draw-bar atached to a wagon and tractor, the same having parts broken away and in section to more clearly illustrate structural features.

Figure 2 is a plan view of the draw-bar with parts broken away and in section, the section being indicated by line 2—2 of Figure 1, and Figure 3 is a detail cross sectional view of the same, the section being indicated by line 3—3 of Figure 1.

Referring by characters to the drawings, 1 indicates a hollow rectangular inner tongue section connected, at is base, to a vehicle axle 2. The above tongue section is provided with outer end aligned apertures 3 and inner end aligned apertures 4. Directly rearward of the inner apertures, the tongue section has fitted thereto a clip 5, for the reception of a whiffle-tree A, as indicated in dotted lines of Figure 2.

The tongue section 1 is in telescopic connection with an outer tongue section 6, and the outer end of this section is formed with a coupling 7, adapted to be pivotally connected to a tractor or other power driven unit B.

The inner end of the outer tongue section carries a bracket 8, which bracket has mounted therein a spring urged coupling pin 9, the said pin, as shown in Figure 1, being in engagement with the inner tongue apertures 4.

When the tongue sections are fully contracted, with relation to each other, the end of the inner tongue section 1 abuts a stud 10, carried by the outer tongue section, whereby contraction of the telescopic tongue members is limited. Thus when so limited, the coupling apertures 4 are brought into alignment with the coupling pin 9, whereby said pin, under spring tension, will snap into position to lock the aforesaid tongue members, fully contracted.

It is understood that aligned apertures are bored in the outer tongue section for the reception of the stud 10, the same being accurately positioned with reference to the length of said tongue, whereby the end of the same, when in a butting engagement with the bolt will accurately align the apertures at the opposite end of said tongue section to insure locking the telescopic parts together. Hence, the stop permits varying lengths of the inner tongue section, whereby the same in conjunction with the outer tongue section may lengthen or shorten the distance between the two vehicles.

When it is desired to disconnect the wagon C from the tractor, for the purpose of attaching draft animals thereto, the outer tongue section is disconnected from the tractor and the spring controlled pin is manually lifted to release the coupling connection, and thereafter the outer tongue section is drawn forward to provide the proper length of vehicle tongue and the same is then locked in its extended position, by engagement of the coupling pin 9, with the apertures 3. The convertible draw-bar is thus extended to form a standard length of tongue adapted to receive draft animals, and in such position the whiffletree, shown in dotted lines, is attached to the clip 5.

In coupling the draw-bar and the vehicle to a tractor, the vehicles are positioned accessible to each other, irrespective of alignment, and the coupling connection is effected, with relation to the tractor. The tongue elements are fitted in telescopic union and upon backing of the tractor, the said tongue elements are telescoped to the position shown in Figure 1, whereby said tongue elements are locked together in their contracted position.

In the locking operation noted above, it should be noted that the telescopic draw-bar sections are more or less distended as to length and the spring controlled pin will be in engagement with the upper wall surface of the inner tongue section, between the pair of alined apertures 3 and 4 therein. Hence, when the tractor is backed towards the wagon C the spring pin will ride upon the wall of the inner tongue section until it is alined with the apertures 4 therein whereby the pin will automatically plunge through the alined apertures to lock the draw-bar.

It follows that should it be desired to convert the draw-bar into a tongue, the spring plunger is simply lifted from its locking engagement and immediately upon a slight movement of the outer section 6, the pin is released and upon a further forward movement of the tractor, the apertures 3 will will aline with the pin whereby said pin will lock the two sections to convert them into a tongue of the desired length. Thus the two movements of the draw-bar are automatic.

While I have particularly shown the draw-bar applicable to a horse drawn farm implement, it is equally applicable to various agricultural implements, wherein the tongue may not be designed for animal draft.

I claim:

A convertible draw-bar for vehicles comprising a rectangular hollow inner tongue section having alined pairs of vertically disposed upper and lower wall spaced apertures adjacent its inner and outer ends, an outer rectangular hollow tongue section in telescopic union with the inner section, a coupling member at the end of the outer tongue section, and a spring controlled coupling pin secured adjacent to the end of the outer tongue section, the end of the pin being in engagement with the upper wall of the inner tongue section between its pairs of apertures when the tongue sections are freely slidable one upon the other for adjustment, a stud seated in apertures of the outer tongue section for engagement with the end of the inner tongue section, whereby the spring pin is aligned with the inner tongue end apertures to accommodate different lengths of inner tongues whereby said sections may be adjusted to conform to a draw-bar length and locked by the pin engaging one pair of the apertures of the inner tongue section.

JULIUS J. SUESS.

REFERENCES CITED

The following references are of record in the file of this patent:

UNITED STATES PATENTS

| Number | Name | Date |
| --- | --- | --- |
| 1,563,860 | Jacobson | Dec. 1, 1925 |
| 2,179,439 | Trow | Nov. 7, 1939 |
| 2,366,294 | Stringer | Jan. 2, 1945 |
| 2,384,245 | Forney | Sept. 4, 1945 |